United States Patent
Koizumi

(10) Patent No.: US 12,111,409 B2
(45) Date of Patent: Oct. 8, 2024

(54) IMAGE PROCESSING APPARATUS, SYSTEM, IMAGE PROCESSING METHOD, AND IMAGE PROCESSING PROGRAM

(71) Applicant: Sony Interactive Entertainment Inc., Tokyo (JP)

(72) Inventor: Makoto Koizumi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 195 days.

(21) Appl. No.: 17/635,304

(22) PCT Filed: Aug. 28, 2019

(86) PCT No.: PCT/JP2019/033709
§ 371 (c)(1),
(2) Date: Feb. 14, 2022

(87) PCT Pub. No.: WO2021/038752
PCT Pub. Date: Mar. 4, 2021

(65) Prior Publication Data
US 2022/0308157 A1  Sep. 29, 2022

(51) Int. Cl.
*G01S 5/20* (2006.01)
*G01S 5/02* (2010.01)
(Continued)

(52) U.S. Cl.
CPC .............. *G01S 5/20* (2013.01); *G01S 5/0294* (2013.01); *G06T 7/20* (2013.01); *H04R 1/406* (2013.01); *H04R 3/005* (2013.01)

(58) Field of Classification Search
CPC ......... G01S 5/20; G01S 5/0294; H04R 3/005; H04R 1/406; G06T 7/20; H04S 2400/11; G06V 20/70; G06V 10/811
See application file for complete search history.

(56) References Cited

U.S. PATENT DOCUMENTS

| 9,294,675 B2 | 3/2016 | Tsubaki |
| 9,578,413 B2 | 2/2017 | Sawa |

(Continued)

FOREIGN PATENT DOCUMENTS

| JP | 2008301161 A | 12/2008 |
| JP | 2010103972 A | 5/2010 |

(Continued)

OTHER PUBLICATIONS

WO-2018163545-A1 (Machine Translation) (Year: 2018).*

(Continued)

*Primary Examiner* — Yuqing Xiao
*Assistant Examiner* — Christopher Richard Walker
(74) *Attorney, Agent, or Firm* — Matthew B. Dernier, Esq.

(57) ABSTRACT

An image processing apparatus includes a first reception section, a second reception section, an association processing section, an object detection section, and a process execution section. The first reception section receives image information acquired by an image sensor. The second reception section receives sound information that is acquired by one or plural directional microphones and that is generated for at least a partial region in a field of the image sensor. The association processing section associates the sound information with a pixel address of the image information indicating a position in the field. The object detection section detects, from the image information, at least a part of an object that is present in the field. The process execution section executes a predetermined process on the object on the basis of a result of the association performed by the association processing section.

15 Claims, 8 Drawing Sheets

(51) Int. Cl.
*G06T 7/20* (2017.01)
*H04R 1/40* (2006.01)
*H04R 3/00* (2006.01)

(56) References Cited

U.S. PATENT DOCUMENTS

| | | | |
|---|---|---|---|
| 10,511,774 B2 | 12/2019 | Takeuchi | |
| 10,769,800 B2 | 9/2020 | Honjo | |
| 10,853,648 B2 | 12/2020 | Oyaizu | |
| 2009/0292504 A1* | 11/2009 | Haas | H04N 25/571 |
| | | | 702/179 |
| 2015/0138380 A1* | 5/2015 | Tsubaki | H04N 23/68 |
| | | | 348/208.1 |
| 2016/0043699 A1 | 2/2016 | Sawa | |
| 2016/0277863 A1* | 9/2016 | Cahill | G01S 3/8083 |
| 2017/0019744 A1* | 1/2017 | Matsumoto | G06V 10/147 |
| 2017/0154638 A1* | 6/2017 | Hwang | G01S 3/808 |
| 2017/0366896 A1* | 12/2017 | Adsumilli | H04N 23/60 |
| 2018/0098082 A1 | 4/2018 | Burns | |
| 2018/0308242 A1 | 10/2018 | Honjo | |
| 2019/0045126 A1 | 2/2019 | Takeuchi | |
| 2019/0171882 A1 | 6/2019 | Oyaizu | |

FOREIGN PATENT DOCUMENTS

| | | | | |
|---|---|---|---|---|
| JP | 2011217334 A | | 10/2011 | |
| JP | 2013141090 A | * | 7/2013 | |
| JP | 2015100066 A | | 5/2015 | |
| JP | 2015177490 A | | 10/2015 | |
| JP | 2016039407 A | | 3/2016 | |
| JP | 2017028529 A | | 2/2017 | |
| JP | 2017175474 A | | 9/2017 | |
| JP | 2018185635 A | | 11/2018 | |
| JP | 2019029962 A | | 2/2019 | |
| WO | 2017159003 A1 | | 9/2017 | |
| WO | WO-2018163545 A1 | * | 9/2018 | B60R 11/02 |

OTHER PUBLICATIONS

JP-2013141090-A (Machine Translation) (Year: 2013).*
International Search Report for corresponding PCT Application No. PCT/JP2019/033709, 5 pages, dated Nov. 12, 2019.

* cited by examiner

IMAGE PROCESSING APPARATUS, SYSTEM, IMAGE PROCESSING METHOD, AND IMAGE PROCESSING PROGRAM

TECHNICAL FIELD

The present invention relates to an image processing apparatus, a system, an image processing method, and an image processing program.

BACKGROUND ART

There is known a moving object detection technology that performs image analysis with use of images generated by an imaging apparatus and thereby detects or tracks an object. Moving object detection is advantageous in focus adjustment performed upon imaging or application to monitoring cameras. A technology related to such moving object detection is described, for example, in PTL 1. The invention described in PTL 1 includes a mode for acquiring RGB (Red-Green-Blue) video and a mode for acquiring infrared video and realizes efficient moving object detection by determining, at the time of performing moving object detection with use of a background differencing technique, whether or not a background model should be regenerated.

CITATION LIST

Patent Literature

[PTL 1] Japanese Patent Laid-open No. 2018-185635

SUMMARY

Technical Problem

Yet, a good deal of erroneous detection is made in moving object detection. Erroneous detection causes problems in various kinds of post-processing based on moving object detection, and thus, there is a demand for selective execution of a process on an appropriate object according to the purpose of the process.

As such, the present invention aims to provide an image processing apparatus, a system, an image processing method, and an image processing program that are capable of executing a process on an appropriate object according to the purpose of the process.

Solution to Problem

According to one aspect of the present invention, provided is an image processing apparatus including a first reception section, a second reception section, an association processing section, an object detection section, and a process execution section. The first reception section receives image information acquired by an image sensor. The second reception section receives sound information that is acquired by one or plural directional microphones and that is generated for at least a partial region in a field of the image sensor. The association processing section associates the sound information with a pixel address of the image information indicating a position in the field. The object detection section detects, from the image information, at least a part of an object that is present in the field. The process execution section executes a predetermined process on the object on the basis of a result of the association performed by the association processing section.

According to another aspect of the present invention, provided is a system including an image sensor, one or plural directional microphones, and a terminal apparatus. The terminal apparatus includes a first reception section, a second reception section, an association processing section, an object detection section, and a process execution section. The image sensor acquires image information. The one or plural directional microphones acquire sound information that is generated for at least a partial region in a field of the image sensor. The first reception section receives the image information. The second reception receives the sound information. The association processing section associates the sound information with a pixel address of the image information indicating a position in the field. The object detection section detects, from the image information, at least a part of an object that is present in the field. The process execution section executes a predetermined process on the object on the basis of a result of the association performed by the association processing section.

According to yet another aspect of the present invention, provided is an image processing method including the steps of receiving image information acquired by an image sensor, receiving sound information that is acquired by one or plural directional microphones and that is generated for at least a partial region in a field of the image sensor, associating the sound information with a pixel address of the image information indicating a position in the field, detecting, from the image information, at least a part of an object that is present in the field, and executing a predetermined process on the object on the basis of a result of the association.

According to still another aspect of the present invention, provided is an image processing program that causes a computer to realize the functions of receiving image information acquired by an image sensor, receiving sound information that is acquired by one or plural directional microphones and that is generated for at least a partial region in a field of the image sensor, associating the sound information with a pixel address of the image information indicating a position in the field, detecting, from the image information, at least a part of an object that is present in the field, and executing a predetermined process on the object on the basis of a result of the association.

DESCRIPTION OF EMBODIMENTS

Some embodiments of the present invention will be described in detail below with reference to the attached drawings. It is to be noted that, in the present specification and drawings, constituent elements that have substantially the same functions and configurations are denoted by identical reference signs and will thus not be described redundantly.

First Embodiment

Figure 1:
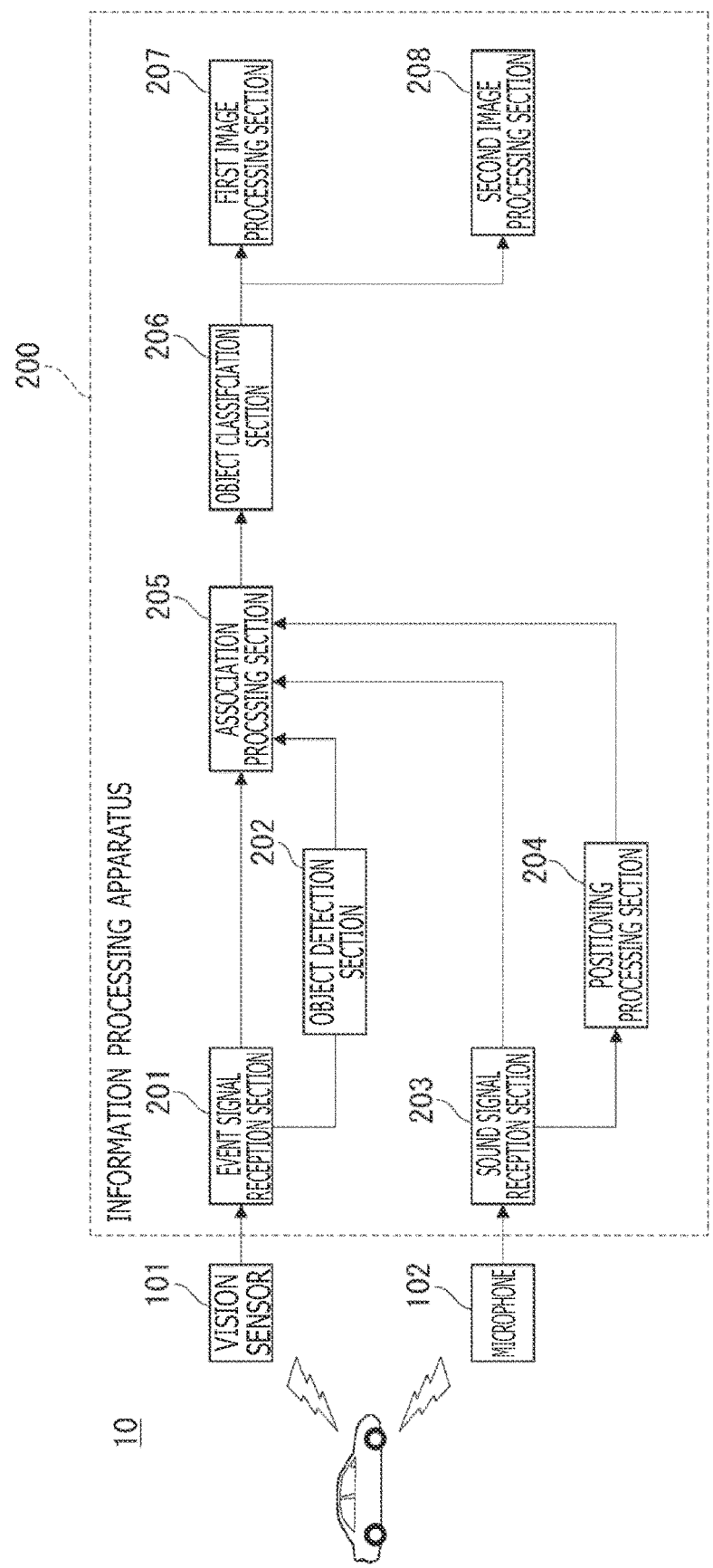
FIG. 1 is a block diagram illustrating a schematic configuration of a system according to a first embodiment of the present invention.

FIG. 1 is a block diagram illustrating a schematic configuration of an image processing system 10 according to a first embodiment of the present invention.
In the illustrated example, the image processing system 10 includes a vision sensor 101, a microphone 102, and an information processing apparatus 200.

The vision sensor 101 includes a sensor array and a processing circuit. The sensor array includes event driven sensors (EDSs) that generate an event signal upon detection of a light intensity change. The processing circuit is connected to sensors. An EDS includes light receiving elements and generates an event signal upon detecting an intensity change in incident light, more specifically, a luminance change. An EDS that has not detected a luminance change generates no event signal, and thus, in the vision sensor 101, an event signal is generated time-asynchronously with respect to a pixel address at which an event has occurred. Specifically, an event signal includes identification information (for example, a pixel address) of a sensor, polarity (increase or decrease) of the luminance change, and a time stamp. The event signal generated by the vision sensor 101 is output to the information processing apparatus 200.

The microphone 102 converts, into a sound signal, a sound that is generated in at least a partial region in a field of the vision sensor 101. The microphone 102 includes, for example, plural directional microphones that constitute a microphone array. Upon detecting a sound of a level equal to or higher than a predetermined signal level, the microphone 102 generates a sound signal associated with position information indicating a position where the sound has been generated and that is in at least a partial region in the field of the vision sensor 101. The sound signal generated by the microphone 102 includes information regarding the position (for example, XY coordinates) in the field of the vision sensor 101, a signal level (sound volume), and a time stamp. The sound signal generated by the microphone 102 is output to the information processing apparatus 200. Here, as the time stamp of the sound signal, the time stamp of the event signal is used in common, or the time stamp of the sound signal can be associated with the time stamp of the event signal.

The information processing apparatus 200 is implemented by a computer that includes a communication interface, a processor, and a memory, for example. The information processing apparatus 200 includes functions of an event signal reception section 201, an object detection section 202, a sound signal reception section 203, a positioning processing section 204, an association processing section 205, an object classification section 206, a first image processing section 207, and a second image processing section 208 that are implemented by the processor operating in accordance with a program stored in the memory or received via the communication interface. In the following description, functions of the sections will further be described.

The event signal reception section 201 receives event signals generated by the vision sensor 101. In a case where a position of an object changes in the field of the vision sensor 101, a luminance change occurs, and the event signal reception section 201 receives the event signal generated by the EDS with the pixel address at which such a luminance change has occurred. It is to be noted that a position change of an object in the field is caused not only when an object moves in the field of the vision sensor 101 but also when an object that is in reality still appears to move due to movement of the apparatus on which the vision sensor 101 is mounted. However, such a difference in the cause of the position change cannot be identified by the event signals generated by the EDS.

The object detection section 202 detects an object on the basis of the event signals received by the event signal reception section 201. For example, the object detection section 202 detects an object present in continuous pixel regions that are indicated by the received event signals as regions in which an event of the same polarity has occurred, and supplies information indicating the detection result to the association processing section 205. As described above, since a distinction between the object that is actually moving and the object that appears to be moving due to movement of the apparatus on which the vision sensor 101 is mounted cannot be made by an event signal, objects detected by the object detection section 202 include objects that are actually moving in the field of the vision sensor 101 and objects that appear to be moving due to the movement of the apparatus on which the vision sensor 101 is mounted but are in reality still.

The sound signal reception section 203 receives sound signals generated by the microphone 102. Here, the sound signals received by the sound signal reception section 203 are associated with position information indicating the position where the sound has been generated and that is in at least a partial region in the field of the vision sensor 101. In many cases, an object that is actually moving in the field of the vision sensor 101 accompanies a sound generated by the object itself (for example, a sound generated by a motor or an engine, a sound of collision of parts, or the like) or a sound generated in association with movement of the object (for example, friction sound, wind noise, and the like). Sound signals indicating the abovementioned sounds are received together with position information by the sound signal reception section 203. As described above, while a distinction between an object that is actually moving and an object that appears to be moving but is in reality still is not made in the object detection based on event signals received from the vision sensor 101, the sound signals from the microphone 102 are highly likely to be acquired only for objects that are actually moving.

The positioning processing section 204 performs a process of adjusting the coordinate system of the sound signal received by the sound signal reception section 203 to the coordinate system of the event signal received by the event signal reception section 201. It is to be noted that the position information (pixel address) of event signals generated by the vision sensor 101 and position information of sound signals generated by the microphone 102 are calibrated in advance, and the positioning processing section 204 performs geometric operation on the basis of a correlation between the two pieces of position information to thereby perform the process of converting the coordinate system of the sound signal received by the sound signal reception section 203 to the coordinate system of the event signal received by the event signal reception section 201. It is to be noted that the vision sensor 101 and the microphone 102 may be arranged in a coaxial manner or in proximity to each other. In this case, the abovementioned calibration can be performed in a simplified but accurate way.

The association processing section 205 uses the result of processing by the positioning processing section 204 and performs a process of associating the sound signal with the pixel address corresponding to a region in an image in which the object detected by the object detection section 202 is present. In the present embodiment, the positioning processing section 204 converts the coordinate system on the basis of the result of calibration performed on the position information of the sound signal and the pixel address, and thus, the association processing section 205 also associates sound information with the pixel address with use of the result of calibration performed on the position information and the pixel address. Specifically, for example, the association processing section 205 associates the pixel address of the object with information based on the sound signal indicating the sound generated at a position that coincides with or overlaps the region in the image in which the object is present, during the period of time (for example, a period of time between the point of time where the time stamp of the event signal is minimum and the point of time where the time stamp of the event signal is maximum) in which the event signal that served as the basis for the detection of the object has been generated. Here, the information to be associated with the pixel address of the object may include, for example, only information indicating whether or not sound has been detected or may further include a signal level of the sound signal and the like.

The object classification section 206 classifies the objects detected by the object detection section 202, on the basis of the result of association performed by the association processing section 205. In the present embodiment, the object classification section 206 classifies objects with which information indicating sound detection has been associated and objects with which information indicating that a signal level of a sound signal is equal to or higher than a threshold has been associated as objects with sound and other objects as objects without sound. Alternatively, the object classification section 206 may classify objects with which information indicating sound detection has been not associated and objects with which information indicating that a signal level of a sound signal is lower than the threshold has been associated as objects without sound and other objects as objects with sound.

Here, based on an assumption that "objects that are actually moving generate sounds," objects with sound that are classified by the processing of the object classification section 206 as described above are objects (moving objects) that are actually moving and objects without sound that are similarly classified by the processing of the object classification section 206 as described above are objects (background) that appear to be moving but are in reality still.

The first image processing section 207 performs first image processing on the basis of information regarding an object that is classified as an object with sound by the object classification section 206. The first image processing is a process targeting an object (moving object) that is actually moving, for example, and includes a tracking process and a process of clipping and drawing a moving object, for example.

For example, in a case where the first image processing section 207 executes a tracking process, the object classification section 206 adds only the abovementioned object with sound to the tracking target object. Then, the first image processing section 207 performs, on the tracking target object, the tracking process based on a result of time-series detection of event signals.

On the other hand, the second image processing section 208 performs second image processing on the basis of information regarding an object that is classified as an object without sound by the object classification section 206. The second image processing is, for example, a process targeting an object (background) that appears to be moving but is in reality still, and includes a self-position estimation process, a motion cancelling process, and a process of erasing the moving body from the image and drawing only the background, for example.

For example, in a case where the second image processing section 208 executes a self-position estimation process, the object classification section 206 adds only the abovementioned object without sound to the target object of the self-position estimation process. Then, the second image processing section 208 performs, on the target object, the self-position estimation process using, for example, simultaneously localization and mapping (SLAM), on the basis of the result of the time-series detection of event signals. Similarly, also in the case where the second image processing section 208 executes a motion cancelling process, the object classification section 206 adds only the abovementioned object without sound to the target object of the motion cancelling process. Then, the second image processing section 208 performs the motion cancelling process for compensatory rotation or movement of the vision sensor 101 such that the position of the target object is maintained in the field of the vision sensor 101. The motion cancelling process may be executed, for example, by transmission of a control signal to a driving section of an apparatus on which the vision sensor 101 is mounted.

Figure 2:
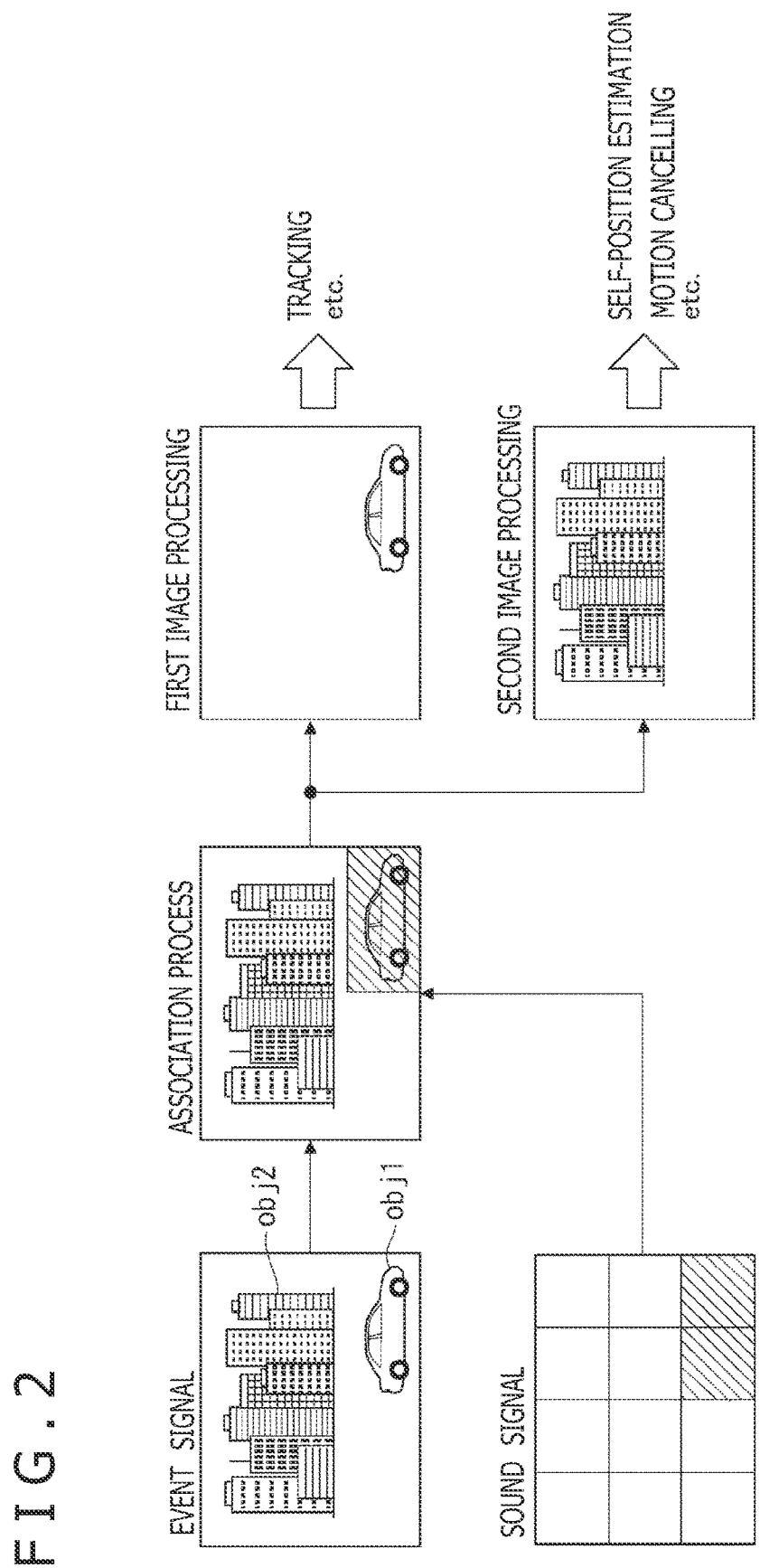
FIG. 2 is a diagram for schematically describing a flow of processing according to the first embodiment of the present invention.

FIG. 2 is a diagram for conceptually describing the processing in the image processing system illustrated in FIG. 1. In the illustrated example, the event signals generated by the vision sensor 101 include those generated for a vehicle (obj1) that is an object (moving object) actually moving and those generated for a building (obj2) that is an object (background) that appears to be moving due to movement of the apparatus on which the vision sensor 101 is mounted. Since the microphone 102 collects only sounds generated as a result of traveling of the vehicle, sound signals are generated only for the regions (illustrated by hatched lines) that coincide with or overlap the vehicle which is a moving body.

As a result, in the association processing section 205 of the information processing apparatus 200, information indicating sound detection (or a signal level of a sound signal that is equal to or higher than the threshold) is associated with only a vehicle object (obj1), and the object classification section 206 classifies the vehicle object (obj1) as the object with sound. The first image processing section 207 executes a process of tracking or the like on the vehicle object (obj1).

On the other hand, in the association processing section 205, information indicating sound detection is not associated with (or a signal level of a sound signal that is lower than the threshold is associated with) a building object (obj2), and the object classification section 206 classifies the building object (obj2) as the object without sound. The second image processing section 208 executes a process of self-position estimation, motion cancelling, and the like with use of the building object (obj2).

It is to be noted that FIG. 2 is illustrated such that the vehicle object (obj) and the building object (obj2) are clipped and drawn separately for the sake of description, but each object is not required to be clipped and drawn as an image, and the abovementioned image processing may be executed without the object being drawn.

Figure 3:
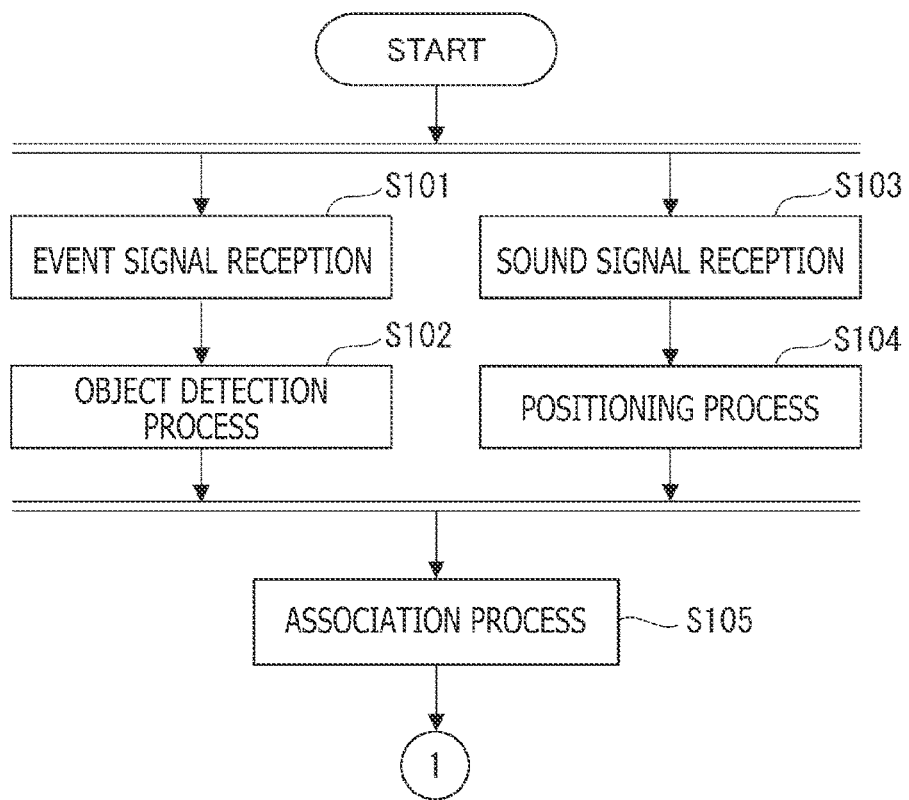
FIG. 3 is a flowchart illustrating an example of a process according to the first embodiment of the present invention.

FIG. 3 is a flowchart illustrating an example of a process according to the first embodiment of the present invention. In the illustrated example, the event signal reception section 201 of the information processing apparatus 200 receives an event signal generated by the vision sensor 101 (step S101), and the object detection section 202 detects an object on the basis of the event signal received by the event signal reception section 201 (step S102). Meanwhile, the sound signal reception section 203 receives the sound signal acquired by the microphone 102 (step S103), and the positioning processing section 204 performs a positioning process (step S104). Then, the association processing section 205 performs an association process for each object detected by the object detection section 202 (step S105).

Figure 4:
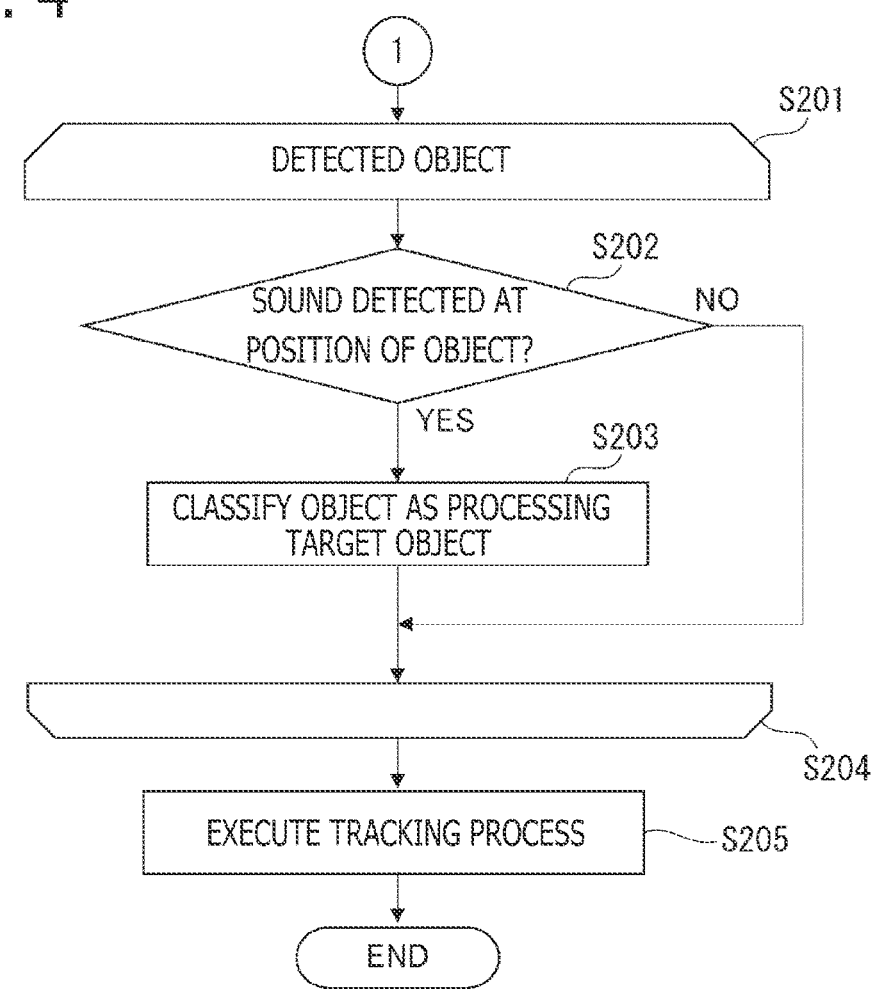
FIG. 4 is a flowchart illustrating another example of the process according to the first embodiment of the present invention.
Figure 5:
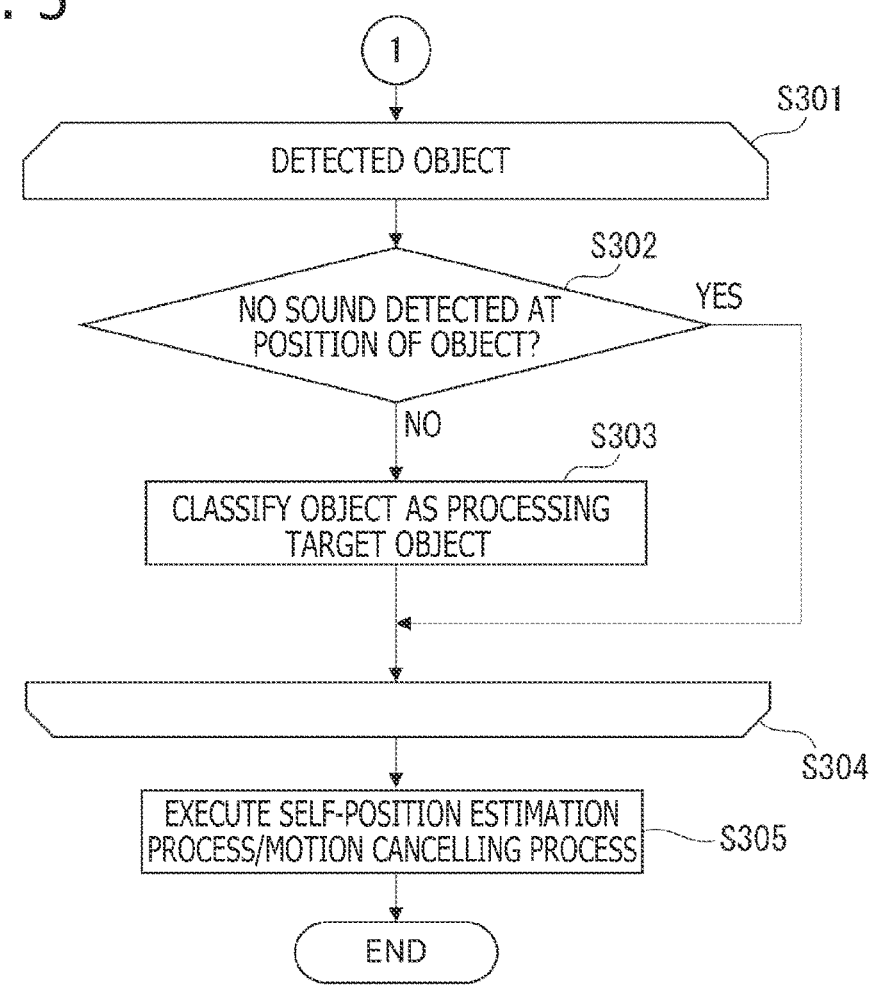
FIG. 5 is a flowchart illustrating a yet another example of the process according to the first embodiment of the present invention.

FIGS. 4 and 5 are flowcharts illustrating two examples of processing in the later stage of the flowchart illustrated in FIG. 3.

In the first example depicted in FIG. 4, after the association processing section 205 has performed the association process, the object classification section 206 determines whether or not sound has been detected at the position of the object (step S202) and classifies the object for which sound has been detected as a processing target object (step S203). The object classification section 206 repeats the classification process (step S201 to step S204) for the objects that have been detected by the object detection section 202 in the abovementioned step S102. Then, the first image processing section 207 executes the tracking process on the object classified as the processing target object (step S205).

In the second example depicted in FIG. 5, after the association processing section 205 has performed the association process, the object classification section 206 determines whether or not sound has been detected at the position of the object (step S302) and classifies the object for which no sound has been detected as a processing target object (step S303). The object classification section 206 repeats the classification process (step S301 to step S304) for the objects that have been detected by the object detection section 202 in the abovementioned step S102. Then, the second image processing section 208 executes the self-position estimation process or the motion cancelling process, by setting, as the object to be used for the self-position estimation process or the motion cancelling process, the object classified as the processing target object (step S305).

In the first embodiment of the present invention as described above, the sound information that has been acquired by the directional microphone 102 and that has been generated for at least a partial region in the field of the vision sensor 101 is associated with the pixel address of the event signal indicating the position in the field, at least a part of an object present in the field is detected from the image information, and a predetermined process is executed on the object on the basis of the result of the association process. Accordingly, application of the sound information enables a process to be performed on an appropriate object according to the purpose of the process.

Further, in the first embodiment of the present invention, objects are classified into objects with sound and objects without sound on the basis of the result of the association process. Executing a predetermined process by selectively using at least either the object with sound or object without sound enables an appropriate process to be executed according to, for example, the characteristic of the object, that is, whether the object is a moving body or a background.

Specifically, for example, in the first embodiment of the present invention, a tracking process can be executed on an object (moving body) that is actually moving. In this case, even in such a situation in which the apparatus on which the vision sensor 101 is mounted is moving, the possibility of identifying an object that is a moving body can be expected to increase. Thus, for example, the problem of erroneously tracking an object that appears to be moving can be avoided even at the time of tracking an approaching object for the purpose of sensing danger. In addition, the possibility of tracking only an object that is truly moving can be increased, and thus, in the case where the apparatus on which the vision sensor 101 is mounted is moving, for example, the object can be tracked without delay and with higher accuracy even if an event signal is generated over the entire screen.

Further, for example, in the first embodiment of the present invention, the self-position estimation process of the apparatus on which the vision sensor 101 is mounted can be executed with use of the result of time-series detection of an object (background) that appears to be moving but is in reality still. For example, in a case where only still objects need to be mapped in the self-position estimation process, in the first embodiment of the present invention, executing the self-position estimation process by properly distinguishing stills objects from other objects increases the accuracy of the map for self-position estimation.

Further, for example, in the first embodiment of the present invention, the motion cancelling process in the apparatus on which the vision sensor 101 is mounted can be executed with use of the result of the time-series detection of an object (background) that appears to be moving but is in reality still. In a case where still objects that serve as a reference in motion cancelling need to be recognized with high accuracy, in the first embodiment of the present invention, performing the motion cancelling process by properly distinguishing still objects from other objects enables a motion cancelling process that properly compensates for the rotation or movement of the vision sensor 101 to be performed.

It is to be noted that the image processing performed by the image processing system 10 as described in the abovementioned example is not limited to those examples.

For example, a configuration in which only one of the series of the image processing described with reference to FIGS. 3 and 4 is performed may be adopted, or a configuration in which plural series of image processing are performed may be adopted.

Further, a configuration in which either only the image processing performed by the first image processing section 207 or the image processing performed by the second image processing section 208 is performed may be adopted. In this case, in the block diagram illustrated in FIG. 1, either only the first image processing section 207 or the second image processing section 208 may be provided.

Second Embodiment

Figure 6:
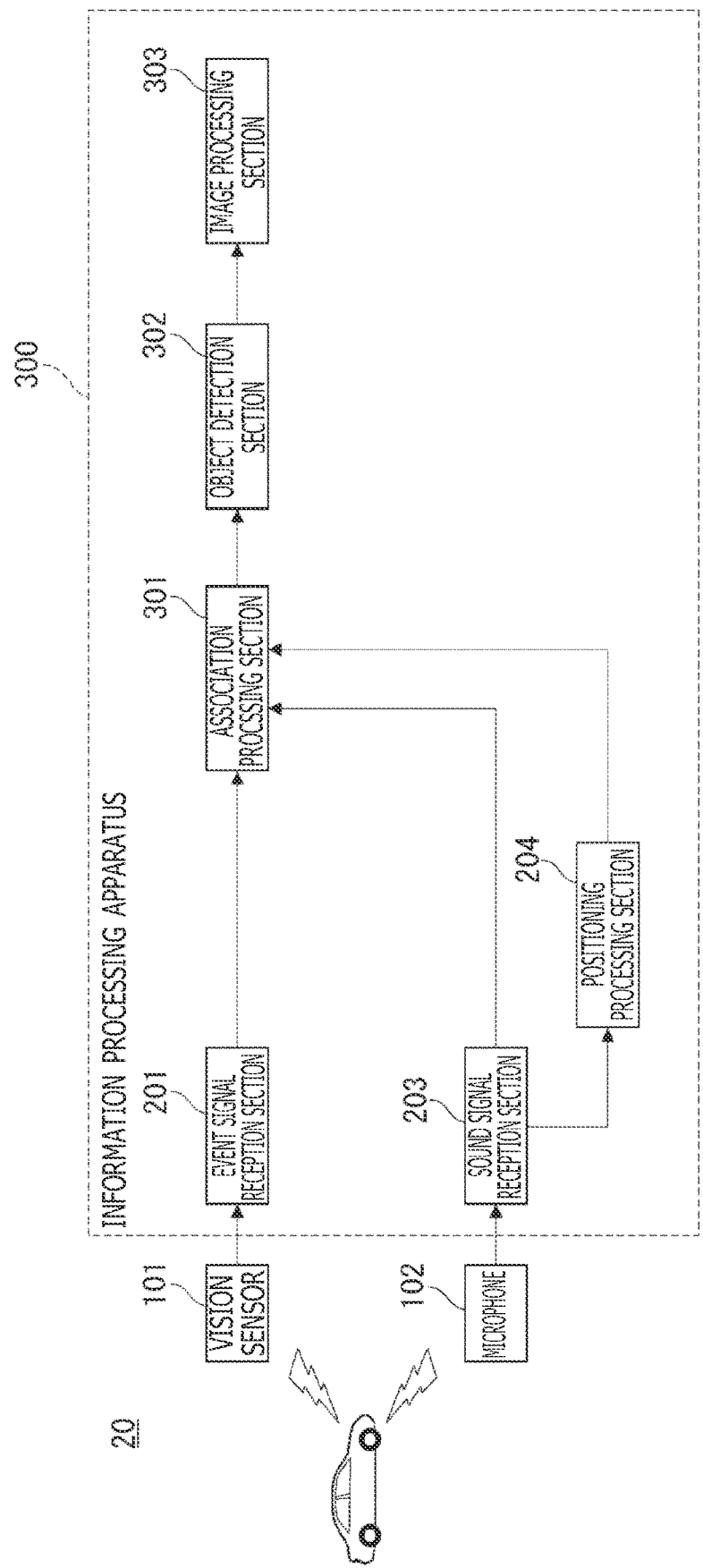
FIG. 6 is a block diagram illustrating a schematic configuration of a system according to a second embodiment of the present invention.

Next, a second embodiment of the present invention will be described in detail. FIG. 6 is a block diagram illustrating a schematic configuration of an image processing system 20 according to the second embodiment of the present invention. Constituent elements having substantially the same functions and configurations as the components of the first embodiment are denoted by identical reference signs and will thus not be described redundantly.

In the first embodiment, an example in which the association process is performed for each detected object has been illustrated, but in the second embodiment, object detection is performed on the basis of the result of the association process.

In the illustrated example, the image processing system 20 includes the vision sensor 101, the microphone 102, and an information processing apparatus 300.

The information processing apparatus 300 is implemented by a computer that includes a communication interface, a processor, and a memory, for example. The information processing apparatus 300 includes functions of the event signal reception section 201, the sound signal reception section 203, the positioning processing section 204, an association processing section 301, an object detection section 302, and an image processing section 303 that are implemented by the processor operating in accordance with the program stored in the memory or received via the communication interface. In the following description, functions of the configurations that are different from those in FIG. 1 will further be described.

The association processing section 301 uses a result of the processing performed by the positioning processing section 204 described in the first embodiment and performs a process of associating the sound signal received by the sound signal reception section 203 with a pixel address of the event signal indicating the position in the field of the vision sensor 101. Specifically, for example, the association processing section 301 associates the pixel address of the event signal with information based on the sound signal indicating the sound generated in at least a partial region in the field of the vision sensor 101 during the period of time (for example, a period of time between the point of time where the time stamp of the event signal is minimum and the point of time where the time stamp of the event signal is maximum) in which the event signal that served as the basis for the detection of the object has been generated. Here, information to be associated with the pixel address of the event signal may include, for example, only information indicating whether or not sound has been detected or may further include a signal level of the sound signal and the like.

The object detection section 302 detects objects on the basis of event signals, in a region in an image that is determined according to the sound signal associated with the pixel address of the event signal. For example, the object detection section 302 detects an object that is present in continuous pixel regions that are indicated by the event signals as regions in which an event of the same polarity has occurred, in a region in an image that is determined according to the sound information based on the characteristic of the object that is the target of the image processing by the image processing section 303. Then, the object detection section 302 supplies, to the image processing section 303, information indicating the result of detection.

For example, in a case where the image processing section 303 uses, as a processing target, an object with sound that is actually moving in the field of the vision sensor 101, as described with reference to the first image processing section 207 in the first embodiment, the object detection section 302 performs object detection based on event signals, in a region in an image with which information indicating sound detection or information indicating that a sound level of a sound signal is equal to or higher than a threshold has been associated as sound information.

Further, for example, in a case where the image processing section 303 uses, as a processing target, an object without sound that appears to be moving due to movement of the apparatus on which the vision sensor 101 is mounted but is in reality still, as described with reference to the second image processing section 208 of the first embodiment, the object detection section 302 performs object detection based on event signals, in a region in an image with which information indicating sound detection has not been associated as sound information or a region in an image with which information indicating that the signal level of the sound signal is lower than the threshold has been associated as sound information.

As described above, in the present embodiment, instead of detecting all of the objects, the object detection section 302 detects only objects that are to be subject to the image processing by the image processing section 303, by applying the sound information.

The image processing section 303 performs image processing, similarly to the first image processing section 207 and the second image processing section 208 of the first embodiment, on the basis of information regarding the objects detected by the object detection section 302.

Figure 7:
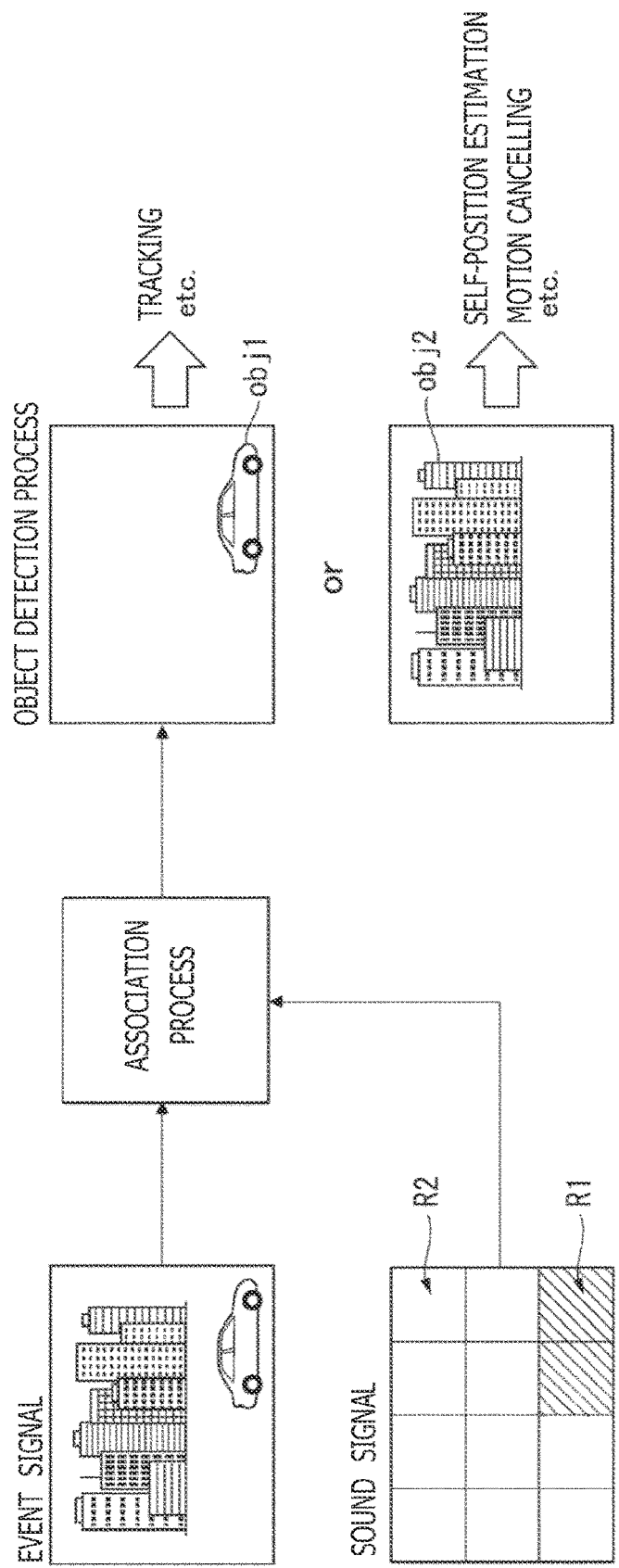
FIG. 7 is a diagram for schematically describing a flow of processing according to the second embodiment of the present invention.

FIG. 7 is a diagram for conceptually describing the processing in the image processing system illustrated in FIG. 6. In the illustrated example, event signals generated by the vision sensor 101 include those generated for a vehicle as an object (moving object) that is actually moving and those generated for a building as an object (background) that appears to be moving due to movement of the apparatus on which the vision sensor 101 is mounted. Since the microphone 102 collects only sounds generated as a result of traveling of the vehicle, sound signals are generated only for the regions (illustrated by hatched lines) that coincide with or overlap the vehicle as a moving body.

As a result, the association processing section 301 of the information processing apparatus 300 associates only a region R1 including the vehicle object with information indicating sound detection (or a signal level of the sound signal that is equal to or higher than the threshold), the object detection section 302 detects the vehicle object (obj1) in the region R1, and the image processing section 303 executes such a process as tracking on the object.

Alternatively, in a region R2 which has not been associated with information indicating sound detection (or which has been associated with the signal level of the sound signal that is lower than the threshold) by the association processing section 301, the object detection section 302 may detect the building object (obj2), and the image processing section 303 may execute such a process as self-position estimation or motion cancelling with respect to the object.

It is to be noted that FIG. 7 is illustrated such that the vehicle object (obj) and the building object (obj2) are clipped and drawn separately for the sake of description, but each object is not required to be clipped and drawn as an image, and the abovementioned image processing may be executed without the object being drawn.

Figure 8:
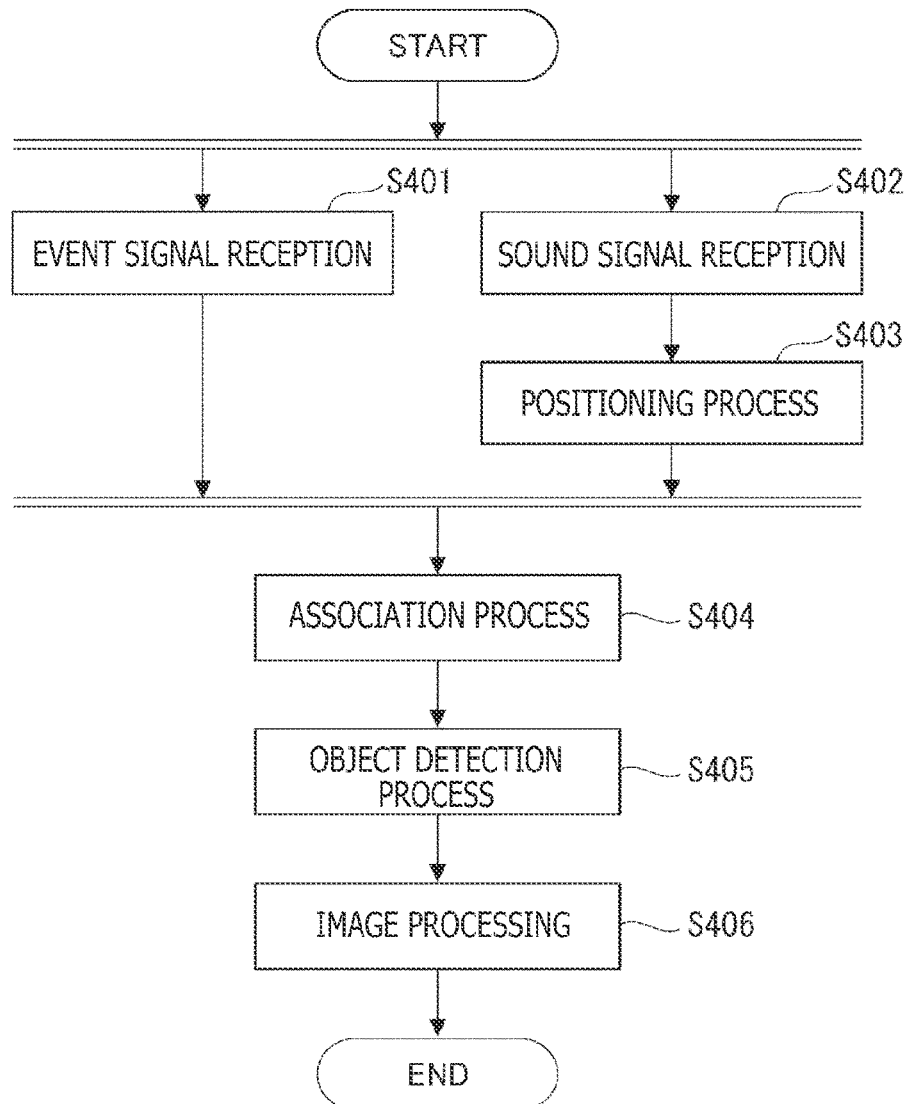
FIG. 8 is a flowchart illustrating an example of a process according to the second embodiment of the present invention.

FIG. 8 is a flowchart illustrating an example of a process according to a second embodiment of the present invention. In the illustrated example, the event signal reception section 201 of the information processing apparatus 300 receives the event signal generated by the vision sensor 101 (step S401). Meanwhile, the sound signal reception section 203 receives the sound signal acquired by the microphone 102 (step S402), and the positioning processing section 204 performs the positioning process (step S403). Then, the association processing section 301 performs the association process (step S404). Subsequently, the object detection section 302 detects an object on the basis of the event signal received by the event signal reception section 201 (step S405), and the image processing section 303 executes the image processing (step S406).

In the second embodiment of the present invention as described above, executing a predetermined process on an object detected in a region in an image that is determined according to the sound information associated with a pixel address enables a process to be executed on an object according to the purpose of the process.

It is to be noted that the image processing performed by the image processing system 10 and the image processing system 20 described in the abovementioned embodiments may be executed in combination with general, image-based object recognition (General Object Recognition). For example, in a case where an object that is identified by image-based object recognition as an object that is normally still, such as a structure (such as a building) or a stationary object (such as a chair), is classified as an object without sound (background that appears to be moving but is in reality still) by the object classification section 206 of the information processing apparatus 200, object classification can be determined to have been performed properly. On the other hand, in a case where the result of recognition by the image-based object recognition is inconsistent with the result of classification, object classification is determined not to have been performed properly, and for example, object recognition or association with a sound signal may be executed again. Such a configuration improves the accuracy of object classification.

Further, for example, in a case where an object identified by the image-based object recognition matches in characteristic with an object detected by the object detection section 302 of the information processing apparatus 300, object detection by the object detection section 302 can be determined to have been performed properly. On the other hand, in a case where the result of recognition by the image-based object recognition is inconsistent with the result of detection, object detection by the object detection section 302 is determined not to have been performed properly, and for example, object recognition or association with a sound signal can be executed again. Such a configuration improves the accuracy of object detection.

Further, in the abovementioned embodiments, frequency analysis may be performed on the sound signal generated by the microphone 102 and the type and characteristic of the sound source may be recognized, to thereby determine whether or not the result of recognition based on the sound signal is consistent with the result of recognition by the general object recognition described above. In this case, for example, in a case where the result of recognition of the object based on the sound signal indicates an animal call and the result of recognition by the general object recognition indicates an animal, the recognition results are consistent, and thus, the object is made subject to the association process and the object classification process. On the other hand, in a case where the recognition results are inconsistent, noise is determined to have been generated in at least either the image signal or the sound signal, and the object is not made subject to the association process nor to the object classification process. Such a configuration improves the accuracy of object detection.

Further, the image processing performed by the image processing system 10 and the image processing system 20 as described in the abovementioned embodiments may be applied to the tracking process targeting a specific object. For example, in a case where an input device such as a controller of a game apparatus is to be tracked, the input device includes a transmitting member that constantly outputs a predetermined sound. Then, a rough tracking process is first performed on the basis of the sound information, and a tracking range is next specified on the basis of the rough tracking process. Subsequently, a more detailed tracking process is performed on the basis of image information, thereby reducing the processing load while improving the accuracy of the tracking process.

Further, in the image processing system 10 and the image processing system 20 described in the abovementioned embodiments, an example in which the vision sensor 101 generates the event signal has been illustrated, but the present invention is not limited to this example. For example, in place of the vision sensor 101, an imaging apparatus that acquires an RGB image may be included in the image processing system 10 or 20. In this case, for example, a similar effect is available through object detection that is based on a difference between plural frame images. It is to be noted that performing object detection by specifying the detection range on the basis of the sound information also reduces the processing load of the object detection.

It is to be noted that the image processing system 10 and the image processing system 20 described in the abovementioned embodiments may be implemented in a single apparatus or may be implemented in plural apparatuses in a distributed manner. For example, the image processing system 10 and the image processing system 20 may be implemented in whole in a terminal apparatus including the vision sensor 101 or the information processing apparatus 200 and the information processing apparatus 300 may be implemented separately in a server apparatus. Further, a configuration in which data obtained after the association process or the object classification is stored and image processing is performed ex-post facto may be adopted. In this case, image processing may be performed by such a configuration in which functions of an event signal reception section, a sound signal reception section, an object detection section, a positioning processing section, an association processing section, an object classification section, a first image processing section, a second image processing section, and an image processing section are each implemented in different apparatuses.

While some embodiments of the present invention have been described above with reference to the attached drawings, the present invention is not limited to such embodiments. A person having ordinary knowledge in the technical field to which the present invention belongs can obviously conceive of various kinds of modifications or alterations within the scope of the technical idea described in the claims, and such modifications and alternations should be understood to naturally fall within the technical scope of the present invention.

REFERENCE SIGNS LIST 10, 20: Information processing system
101: Vision sensor
102: Microphone
200, 300: Information processing apparatus
201: Event signal reception section
202, 302: Object detection section
203: Sound signal reception section 204: Positioning processing section
205, 301: Association processing section
206: Object classification section
207: First image processing section
208: Second image processing section
303: Image processing section

The invention claimed is:

1. An image processing apparatus comprising:
a first reception section configured to receive image information acquired by an image sensor;
a second reception section configured to receive sound information that is acquired by one or plural directional microphones and that is generated for at least a partial region in a field of the image sensor;
an association processing section configured to associate the sound information with a pixel address of the image information indicating a position in the field;
an object detection section configured to detect, from the image information, at least a part of an object that is present in the field; and
a process execution section configured to execute a predetermined process on the object on a basis of a result of the association performed by the association processing section,
wherein the predetermined process is a function of whether or not the position in the field at which the sound information is associated overlaps with an area within the field at which the object is located, and
wherein the process execution section operates to distinguish between determinations that:
(i) the object appears to be moving and is actually moving in the field based on a determination that the sound information indicates an acoustic level above a predetermined threshold and the position in the field that is associated overlaps with the area within the field at which the object is located; and
(ii) the object appears to be moving and is not actually moving in the field based on a determination that the sound information indicates an acoustic level not above the predetermined threshold and the position in the field that is associated overlaps with the area within the field at which the object is located.

2. The image processing apparatus according to claim 1, wherein
the second reception section receives the sound information associated with position information indicating the position in the field, and
the association processing section associates the sound information with the pixel address by using a result of calibration on the position information and the pixel address.

3. The image processing apparatus according to claim 1, wherein
the association processing section associates the sound information with the pixel address corresponding to a region in an image in which the object that has been detected by the object detection section is present, and
the process execution section executes the predetermined process on the object corresponding to the pixel address with which the sound information has been associated.

4. The image processing apparatus according to claim 1, wherein
the object detection section detects the object in a region in an image that is determined according to the sound information associated with the pixel address, and
the process execution section executes the predetermined process on the object that has been detected by the object detection section.

5. The image processing apparatus according to claim 3, further comprising:
an object classification section that classifies the object detected by the object detection section into a first object or a second object, according to the sound information associated with the pixel address corresponding to the region in the image in which the object is present, wherein
the process execution section executes the predetermined process on the object that is classified as the first object.

6. The image processing apparatus according to claim 1, wherein
the sound information includes information indicating whether or not sound has been detected, and
the process execution section executes the predetermined process on the object detected with the pixel address associated with the sound information indicating that sound has been detected.

7. The image processing apparatus according to claim 6, wherein the process execution section executes a tracking process with use of a result of time-series detection of the object.

8. The image processing apparatus according to claim 1, wherein
the sound information includes information indicating whether or not sound has been detected, and
the process execution section executes the predetermined process on the object detected with the pixel address that has been associated with the sound information indicating that no sound has been detected or that has not been associated with the sound information indicating that sound has been detected.

9. The image processing apparatus according to claim 8, wherein the process execution section executes a self-position estimation process for an apparatus on which the image sensor is mounted, with use of a result of time-series detection of the object.

10. The image processing apparatus according to claim 8, wherein the process execution section executes a motion cancelling process on an apparatus on which the image sensor is mounted, with use of a result of time-series detection of the object.

11. The image processing apparatus according to claim 1, wherein the process execution section extracts, from the image information, image information including only the object.

12. The image processing apparatus according to claim 1, wherein
the image sensor is an event-driven vision sensor that generates an event signal upon detecting an intensity change in incident light, for each pixel, and
the image information includes the event signal.

13. A system comprising:
an image sensor configured to acquire image information;
one or plural directional microphones configured to acquire sound information that is generated for at least a partial region in a field of the image sensor; and
a terminal apparatus including
a first reception section configured to receive the image information,
a second reception section configured to receive the sound information, an association processing section configured to associate the sound information with a pixel address of the image information indicating a position in the field, an object detection section configured to detect, from the image information, at least a part of an object that is present in the field, and a process execution section configured to execute a predetermined process on the object, on a basis of a result of the association performed by the association processing section, wherein the predetermined process is a function of whether or not the position in the field at which the sound information is associated overlaps with an area within the field at which the object is located, and wherein the process execution section operates to distinguish between determinations that:

(i) the object appears to be moving and is actually moving in the field based on a determination that the sound information indicates an acoustic level above a predetermined threshold and the position in the field that is associated overlaps with the area within the field at which the object is located; and (ii) the object appears to be moving and is not actually moving in the field based on a determination that the sound information indicates an acoustic level not above the predetermined threshold and the position in the field that is associated overlaps with the area within the field at which the object is located.

14. An image processing method comprising:

receiving image information acquired by an image sensor;

receiving sound information that is acquired by one or plural directional microphones and that is generated for at least a partial region in a field of the image sensor;

associating the sound information with a pixel address of the image information indicating a position in the field;

detecting, from the image information, at least a part of an object that is present in the field; and executing a predetermined process on the object on a basis of a result of the association, wherein the predetermined process is a function of whether or not the position in the field at which the sound information is associated overlaps with an area within the field at which the object is located, and wherein the executing includes distinguishing between determinations that:

(i) the object appears to be moving and is actually moving in the field based on a determination that the sound information indicates an acoustic level above a predetermined threshold and the position in the field that is associated overlaps with the area within the field at which the object is located; and (ii) the object appears to be moving and is not actually moving in the field based on a determination that the sound information indicates an acoustic level not above the predetermined threshold and the position in the field that is associated overlaps with the area within the field at which the object is located.

15. A non-transitory, computer readable storage medium containing a program, which when executed by a computer, causes the computer to perform an image processing method by carrying out actions, comprising:

receiving image information acquired by an image sensor;

receiving sound information that is acquired by one or plural directional microphones and that is generated for at least a partial region in a field of the image sensor;

associating the sound information with a pixel address of the image information indicating a position in the field;

detecting, from the image information, at least a part of an object that is present in the field; and executing a predetermined process on the object on a basis of a result of the association, wherein the predetermined process is a function of whether or not the position in the field at which the sound information is associated overlaps with an area within the field at which the object is located, and wherein the executing includes distinguishing between determinations that:

(i) the object appears to be moving and is actually moving in the field based on a determination that the sound information indicates an acoustic level above a predetermined threshold and the position in the field that is associated overlaps with the area within the field at which the object is located; and (ii) the object appears to be moving and is not actually moving in the field based on a determination that the sound information indicates an acoustic level not above the predetermined threshold and the position in the field that is associated overlaps with the area within the field at which the object is located.

* * * * *